United States Patent [19]

Wilson et al.

[11] Patent Number: 4,539,305

[45] Date of Patent: Sep. 3, 1985

[54] PRETREATMENT METHOD FOR ENHANCING THE SELECTIVITY AND INCREASING THE STABILITY OF A REFORMING CATALYST

[75] Inventors: Charles R. Wilson, San Francisco; Waldeen C. Buss, Kensington; Leslie A. Field, Emeryville, all of Calif.

[73] Assignee: Chevron Research Company, San Francisco, Calif.

[21] Appl. No.: 587,481

[22] Filed: Mar. 8, 1984

[51] Int. Cl.³ .......................... B01J 29/06; B01J 37/08
[52] U.S. Cl. ...................................... 502/66; 502/74; 502/85
[58] Field of Search ............................. 502/66, 74, 85

[56] References Cited

U.S. PATENT DOCUMENTS

| | | | |
|---|---|---|---|
| 3,236,762 | 2/1966 | Rabo et al. | 502/74 X |
| 3,392,124 | 7/1968 | Laurent | 502/74 |
| 3,864,283 | 2/1975 | Schutt | 502/66 |
| 4,002,578 | 1/1977 | Csicsery | 502/66 X |

FOREIGN PATENT DOCUMENTS 130531  4/1978  German Democratic Rep. ... 502/66

*Primary Examiner*—Carl F. Dees
*Attorney, Agent, or Firm*—S. R. LaPaglia; W. K. Turner; E. A. Schaal

[57] ABSTRACT

A pretreatment method is disclosed for enhancing the selectivity and increasing the stability of a reforming catalyst comprising a large-pore zeolite containing at least one Group VIII metal. In this method, the catalyst is reduced in reducing atmosphere at a temperature of from 250° C. to 650° C., exposed to an oxygen-containing gas, treated in a reducing atmosphere at from 120° C. to 260° C., and maintained at a temperature of from 370° C. to 600° C. in a reducing atmosphere.

17 Claims, No Drawings

PRETREATMENT METHOD FOR ENHANCING THE SELECTIVITY AND INCREASING THE STABILITY OF A REFORMING CATALYST

BACKGROUND OF THE INVENTION

The present invention concerns a pretreatment method for enhancing the selectivity and increasing the stability of a reforming catalyst.

Catalytic reforming is a well-known process that is used for raising the octane rating of a naphtha for gasoline. The reactions that occur during reforming include: dehydrogenation of cyclohexanes, dehydroisomerization of alkylcyclopentanes, dehydrocyclization of acyclic hydrocarbons, dealkylation of alkylbenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization, in order to produce high yields of liquid product and low yields of light gases. These catalysts should possess good activity, so that low temperatures can be used in the reformer. Also, they should possess good stability, so that they can maintain a high activity and a high selectivity for dehydrocyclization over a long period of time.

While most reforming catalysts contain platinum on an alumina support, large-pore zeolites have been proposed as supports. These large-pore zeolites have pores large enough for hydrocarbons in the gasoline boiling range to pass through. Catalysts based on these zeolitic supports have been commercially unsuccessful, but recently a new catalyst was developed. That catalyst comprises: large-pore zeolite and a Group VIII metal. That catalyst has a very high selectivity for dehydrocyclization.

SUMMARY OF THE INVENTION

The present invention enhances the selectivity and increases the stability of a large-pore zeolitic reforming catalyst by reducing the catalyst in a reducing atmosphere at a temperature of from 250° C. to 650° C.; exposing the reduced catalyst to an oxygen-containing gas; treating the exposed catalyst in a reducing atmosphere at a temperature of from 120° C. to 260° C.; and maintaining the temperature of the treated catalyst at from 370° C. to 600° C. in a reducing atmosphere.

Preferably, the first reduction step is carried out in the presence of hydrogen at a temperature of from 350° C. to 550° C., the oxygen-containing gas is air, the treating step at 120° C. to 260° C. occurs in the presence of hydrogen at atmospheric pressure for at least twenty minutes, and the final reduction step occurs in the presence of hydrogen for from minutes to 24 hours.

DESCRIPTION OF THE PREFERRED EMBODIMENTS

In its broadest aspect, the present invention involves a pretreatment method for enhancing the selectivity and increasing the stability of a large-pore zeolitic reforming catalyst in a four-step process. In the first step, the catalyst is reduced in a reducing atmosphere at a temperature of from 250° C. to 650° C. In the second step, the reduced catalyst is exposed to an oxygen-containing gas. In the third step, the exposed catalyst is treated in a reducing atmosphere at a temperature of from 120° C. to 260° C. In the fourth step, the temperature of the treated catalyst is maintained at from 370° C. to 600° C. in a reducing atmosphere. By the use of this four-step process, we achieve an enhanced and stable selectivity for dehydrocyclization from the beginning of the run life of the catalyst. The conversion is also stabilized. Another advantage of this four-step process is that the initial hydrocracking is reduced, which reduces the possibilities of exothermic temperature runaways at the start of the run.

In the first step, the catalyst is reduced in a reducing atmosphere at a temperature of from 250° C. to 650° C. Although other reducing gases can be used, a preferred reducing gas is hydrogen. Preferably, the catalyst is reduced at a temperature of from 350° C. to 550° C.

In the second step, the reduced catalyst is exposed to an oxygen-containing gas. Preferably, this oxygen-containing gas is air.

In the third step, the exposed catalyst is treated in a reducing atmosphere at from 120° C. to 260° C. Although other reducing gases can be used, a preferred reducing gas is hydrogen. Preferably, this step occurs in the presence of hydrogen at atmospheric pressure for at least twenty minutes.

In the fourth step, the temperature of the treated catalyst is maintained at from 370° C. to 600° C. in a reducing atmosphere prior to starting the hydrocarbon feed. Although other reducing gases can be used, a preferred reducing gas is hydrogen. Preferably, this step occurs in the presence of hydrogen for from ten minutes to 24 hours.

The feed is a naphtha that contains at least some acyclic hydrocarbons or alkylcyclopentanes. This feed should be substantially free of sulfur, nitrogen, metals, and other known poisons. These poisons can be removed by first using conventional hydrofining techniques, then using sorbents to remove the remaining sulfur compounds.

The feed can be contacted with the catalyst in either a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be either upward, downward, or radial. The pressure is from about 1 atmosphere to about 500 psig, with the preferred pressure being from about 50 psig to about 200 psig. The preferred temperature is from about 430° C. to about 550° C. The liquid hourly space velocity (LHSV) is from about 0.1 $hr^{-1}$ to about 10 $hrs^{-1}$, with a preferred LHSV of from about 0.3 $hr^{-1}$ to about 5 $hrs^{-1}$. Enough hydrogen is used to insure an $H_2$/HC ratio of up to about 20:1. The preferred $H_2$/HC ratio is from about 1:1 to about 6:1. Reforming produces hydrogen. Thus, additional hydrogen is not needed except when the catalyst is pre-reduced and when the feed is first introduced. Once reforming is underway, part of the hydrogen that is produced is recycled over the catalyst.

The catalyst is a large-pore zeolite charged with at least one Group VIII metal. The preferred Group VIII metal is platinum, which is more selective for dehydrocyclization and which is more stable under reforming reaction conditions than other Group VIII metals. The catalyst should contain between 0.1% and 5% platinum of the weight of the catalyst, preferably from 0.1% to 1.5%.

The term "large-pore zeolite" is defined as a zeolite having an effective pore diameter of from 6 to 15 Angstroms. The preferred pore diameter is from 7 to 9 Angstroms. Type L zeolite, zeolite X, and zeolite Y are thought to be the best large-pore zeolites for this operation. Type L zeolite is described in U.S. Pat. No. 3,216,789. Zeolite X is described in U.S. Pat. No. 2,882,244. Zeolite Y is described in U.S. Pat. No. 3,130,007. U.S. Pat. Nos. 3,216,789; 2,882,244; and 3,130,007 are hereby incorporated by reference to show zeolites useful in the present invention. The preferred zeolite is type L zeolite.

Type L zeolites are synthesized largely in the potassium form. These potassium cations are exchangeable, so that other type L zeolites can be obtained by ion exchanging the type L zeolite in appropriate solutions. It is difficult to exchange all of the original cations, since some of these cations are in sites which are difficult to reach. Preferably, the potassium is ion exchanged with an alkaline earth metal, which can be either barium, strontium, or calcium. Barium is preferred because the resulting catalyst has a high activity, a high selectivity for dehydrocyclization, and a high stability. Preferably, the barium should constitute from 0.1% to 35% of the weight of the zeolite, more preferably from 1% to 20%.

An inorganic oxide can be used as a carrier to bind the large-pore zeolite. This carrier can be natural, synthetically produced, or a combination of the two. Preferred loadings of inorganic oxide are from 5% to 50% of the weight of the catalyst. Useful carriers include silica, alumina, aluminosilicates, and clays.

EXAMPLES

The invention will be further illustrated by the following examples which set forth particularly advantageous method and composition embodiments. While the examples are provided to illustrate the present invention, they are not intended to limit it.

A hydrocarbon feed which had been hydrofined to remove sulfur, oxygen and nitrogen, was contacted at 493° C., 100 psig, 6.0 LHSV, and 6.0 $H_2$/HC with six different reforming catalysts in six different runs. The feed contained 81% by volume paraffins, 17% naphthenes, and 2% aromatics. The feed boiling point, by ASTM D-86, was: start 154° F., 5% point 165° F., 10% point 168° F., 20% point 170° F., 30% point 173° F., 40% point 176° F., 50% point 180° F., 60% point 184° F., 70% point 188° F., 80% point 196° F., 90% point 207° F., 95% point 214° F., and end point 232° F. In the test procedure, conversion and selectivity are measured in mole percent by assuming that all naphthenes convert 1 mole to 1 mole of aromatics, calculating loss of $C_6+$ paraffins for conversion, and calculating aromatics formed beyond those in the feed and assumed formed from naphthenes for selectivity.

EXAMPLE I

In the first run, the catalyst was prepared by (1) ion exchanging a potassium-type L with a sufficient volume of 0.3 molar barium nitrate solution at 80° C. to contain an excess of barium compared to the ion exchange capacity of the zeolite; (2) drying the resulting barium-exchanged type L zeolite catalyst; (3) calcining the catalyst at 590° C. in air; (4) impregnating the catalyst with 0.8% platinum using tetrammineplatinum (II) nitrate; (5) drying the catalyst; (6) calcining the catalyst at 260° C. in air; (7) reducing the catalyst in hydrogen at 205° C. for one-half hour, at 370° C. for ten minutes, and at 495° C. for one hour. The test results are shown in Table I.

EXAMPLE II

In the second run, the catalyst was prepared by the procedures of Example I, except that, after Step (6) and before Step (7), the catalyst was reduced in the presence of hydrogen at 495° C. for 16 hours and exposed to air. The test results are shown in Table I.

EXAMPLE III

In the third run, the catalyst was prepared by the procedures of Example I, except that, after Step (6) and before Step (7), the catalyst was reduced in the presence of hydrogen at 495° C. for 20 hours. The test results are shown in Table I.

EXAMPLE IV

In the fourth run, the catalyst was prepared by the procedures of Example I, except that, after Step (6) and before Step (7), the catalyst was reduced in the presence of hydrogen at 495° C. for two hours and exposed to air. The test results are shown in Table I.

TABLE I

| Example | % Conversion of Paraffins | | % Selectivity for dehydrocyclization | |
|---|---|---|---|---|
| | 3 Hours | 20 Hours | 3 Hours | 20 Hours |
| I | 81 | 73 | 76 | 79 |
| II | 80 | 79 | 84 | 84 |
| III | 69 | 68 | 78 | 80 |
| IV | 84 | 83 | 82 | 84 |

Examples II and IV are examples of the present invention.

While the present invention has been described with reference to specific embodiments, this application is intended to cover those changes which may be made by those skilled in the art without departing from the spirit and scope of the appended claims.

What is claimed is:

1. A pretreatment method for enhancing the selectivity and increasing the stability of a reforming catalyst comprising a large-pore zeolite containing at least one Group VIII metal, wherein said method comprises:
   (a) reducing said catalyst in a reducing atmosphere at a temperature of from 250° C. to 650° C.;
   (b) exposing said reduced catalyst to an oxygen-containing gas;
   (c) treating said exposed catalyst in a reducing atmosphere at from 120° C. to 260° C.; and
   (d) maintaining the temperature of the treated catalyst at from 370° C. to 600° C. in a reducing atmosphere.

2. A pretreatment method according to claim 1 wherein said reduction temperature in step (a) is from 350° C. to 550° C., and wherein said reducing atmosphere is a hydrogen gas.

3. A pretreatment method according to claim 1 wherein said oxygen-containing gas is air.

4. A pretreatment method according to claim 1 wherein said step (c) occurs in the presence of hydrogen at atmospheric pressure for at least twenty minutes.

5. A pretreatment method according to claim 4 wherein said step (d) occurs in the presence of hydrogen for from ten minutes to 24 hours.

6. A pretreatment method according to claim 5 wherein said step (d) occurs for about ten minutes.

7. A pretreatment method according to claim 1 wherein said large-pore zeolite has an apparent pore size of from 7 to 9 Angstroms.

8. A pretreatment method according to claim 7 wherein said large-pore zeolite is selected from the group consisting of zeolite X, zeolite Y and type L zeolite.

9. A pretreatment method according to claim 8 wherein said large-pore zeolite is a type L zeolite.

10. A pretreatment method according to claim 1 wherein said Group VIII metal is platinum.

11. A pretreatment method according to claim 10 wherein said catalyst comprises:
 (a) a large-pore zeolite containing platinum; and
 (b) an inorganic binder.

12. A pretreatment method according to claim 11 wherein said inorganic binder is selected from the group consisting of silica, alumina, aluminosilicates, and clays.

13. A pretreatment method according to claim 1 wherein said catalyst contains an alkaline earth metal selected from the group consisting of barium, strontium, and calcium.

14. A pretreatment method according to claim 13 wherein said alkaline earth metal is barium.

15. A pretreatment method according to claim 14 wherein said catalyst has from 8% to 10% by weight barium and from 0.1% to 1.5% by weight platinum.

16. A pretreatment method for enhancing the selectivity and increasing the stability of a reforming catalyst comprising:

(A) a type L zeolite containing from 0.1% to 1.5% by weight platinum; and
(B) an inorganic binder selected from the group consisting of silica, alumina, aluminosilicates, and clays; wherein said pretreatment method comprises:
(a) reducing said catalyst in the presence of hydrogen at a temperature of from 350° C. to 550° C.; and
(b) exposing said reduced catalyst to air;
(c) treating said exposed catalyst in the presence of hydrogen at atmospheric pressure for at least twenty minutes at from 120° C. to 260° C.; and
(d) maintaining the temperature of the treated catalyst at from 370° C. to 600° C. in a reducing atmosphere for about ten minutes.

17. A pretreatment method for enhancing the selectivity and increasing the stability of a reforming catalyst comprising:

(A) a type L zeolite containing from 8% to 10% by weight barium and from 0.1% to 1.5% by weight platinum; and
(B) an inorganic binder selected from the group consisting of silica, alumina, aluminosilicates, and clays; wherein said pretreatment method comprises:
(a) reducing said catalyst in the presence of hydrogen at a temperature of from 350° C. to 550° C.; and
(b) exposing said reduced catalyst to air;
(c) treating said exposed catalyst in the presence of hydrogen at atmospheric pressure for at least twenty minutes at from 120° C. to 260° C.; and
(d) maintaining the temperature of the treated catalyst at from 370° C. to 600° C. in a reducing atmosphere for about ten minutes.

* * * * *